(12) United States Patent
Herz et al.

(10) Patent No.: US 9,127,129 B2
(45) Date of Patent: Sep. 8, 2015

(54) STAR POLYMER

(75) Inventors: Hans-Georg Herz, Marktoberdorf (DE); Gerhard Maier, Munich (DE); Philipp Koelle, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 185 days.

(21) Appl. No.: 13/384,836

(22) PCT Filed: Jul. 23, 2010

(86) PCT No.: PCT/EP2010/060729
§ 371 (c)(1),
(2), (4) Date: Jun. 7, 2012

(87) PCT Pub. No.: WO2011/009949
PCT Pub. Date: Jan. 27, 2011

(65) Prior Publication Data
US 2012/0238699 A1 Sep. 20, 2012

(30) Foreign Application Priority Data
Jul. 24, 2009 (DE) .......................... 10 2009 027 982

(51) Int. Cl.
| | |
|---|---|
| *C07C 49/784* | (2006.01) |
| *C07C 45/72* | (2006.01) |
| *C08L 77/00* | (2006.01) |
| *C08G 83/00* | (2006.01) |
| *C08G 61/10* | (2006.01) |
| *C08G 61/12* | (2006.01) |
| *C08L 101/00* | (2006.01) |

(52) U.S. Cl.
CPC ................ *C08G 83/00* (2013.01); *C08G 61/10* (2013.01); *C08G 61/12* (2013.01); *C08L 77/00* (2013.01); *C08L 101/005* (2013.01); *C08G 2261/342* (2013.01); *C08G 2261/344* (2013.01); *C08G 2261/412* (2013.01)

(58) Field of Classification Search
USPC ............................ 528/220, 225; 525/419, 471
See application file for complete search history.

(56) References Cited

U.S. PATENT DOCUMENTS

| | | | |
|---|---|---|---|
| 5,654,392 A | 8/1997 | Marrocco, III et al. | |
| 2003/0228479 A1* | 12/2003 | Shelby et al. | ................. 428/480 |
| 2009/0227761 A1* | 9/2009 | Bronsaer et al. | .............. 528/342 |

FOREIGN PATENT DOCUMENTS

| | | |
|---|---|---|
| CN | 1265116 | 8/2000 |
| CN | 1946754 | 4/2007 |
| JP | 2005232211 | 9/2005 |
| WO | WO 2005/086727 | 9/2005 |

OTHER PUBLICATIONS

International Search Report for PCT/EP2010/060729, dated Oct. 29, 2010.
* Dietric Baun, Claus Hartwig, Michael Reubold, Maria Soliman: "Molecular Reinforcement by lambda-shaped molecules" Makromol. Chem., Rapid Commun., vol. 14, 31 §Oct. 1993, pp. 663-668, XP002603733.
* Braun, D. et al.: "lambda.-Shaped mesogens. Structure, phase formation and properties" Liquid Crystals: An International Journal of Science and Technology, Taylor & Francis, vol. 16, No. 3, Jan. 1, 1994, pp. 429-443, XP008127830.
Yuechuan Wang and Roderic P. Quirk. "Synthesis and Characterization of Poly(benzoyl-1,4-phenylene)s. 2. Catalyst Coligand Effects on Polymer Properties." Macromolecules, May 8, 1995, vol. 28, pp. 3495-3501.

* cited by examiner

*Primary Examiner* — Jeffrey Mullis
(74) *Attorney, Agent, or Firm* — Kenyon & Kenyon LLP (57) ABSTRACT

A star polymer is produced by converting a central compound having at least three functional groups X, an arylene compound having two functional groups Y, and a terminal group compound having a functional group Z, the functional groups X of the central compound each reacting with a functional group Y of the arylene compound, forming a covalent bond, and the functional group Z of the terminal group compound reacting with a functional group Y of the arylene compound, forming a covalent bond, the terminal group compound being used in a stoichiometric quantity that corresponds essentially to the stoichiometric quantity of the functional groups X of the central compound, and to a method for producing star polymers, a polymer mixture including star polymers, and to the use of star polymers.

8 Claims, 2 Drawing Sheets

STAR POLYMER

BACKGROUND OF THE INVENTION

1. Field of the Invention

The present invention relates to star polymers, a method for producing star polymers, a polymer mixture including star polymers, and the use of star polymers.

2. Description of Related Art

Thermoplastic polymers available up to now have mechanical properties that are for the most part inadequate for certain applications, in particular at high temperatures and under the influence of media such as fuel, motor oil, and brake fluid. In particular, their rigidity, in combination with high tensile strength and resistance to vibration, is often inadequate.

Certain glass fiber-reinforced polyamides can have a high tensile strength in the processing direction (flow direction), but such materials are often anisotropic and do not have adequate strength transverse to the processing direction (flow direction).

Polymers having intrinsically rigid chains, such as polyarylenes or polyphenylenes, can have very high mechanical strength and rigidity. Branched polyarylenes are described for example in published international patent application document WO 2005/086727.

However, polyarylenes can be soluble in a series of solvents, which can result in limited resistance to fuel, motor oil, and similar media.

BRIEF SUMMARY OF THE INVENTION

The present invention provides a star polymer produced by converting
  a central compound having at least three functional groups X,
  an arylene compound having two functional groups Y, and
  a terminal group compound having a functional group Z,
the functional groups X of the central compound each reacting with a functional group Y of the arylene compound, forming a covalent bond, and the functional group Z of the terminal group compound reacting with a functional group Y of the arylene compound, forming a covalent bond,
the terminal group compound being used in a stoichiometric quantity that corresponds essentially to the stoichiometric quantity of the functional groups X of the central compound.

Here, "essentially" means that deviations from a 1:1 ratio of less than 5%, for example less than 2%, are included.

Due to the use of arylene compounds, the star polymer according to the present invention has a high intrinsic rigidity. Therefore, the star polymer according to the present invention can advantageously be used as a "molecular reinforcing agent."

Due to the fact that the terminal group compound is used in a stoichiometric quantity corresponding to the stoichiometric quantity of the functional groups X of the central compound, a star polymer that is essentially isotropic and/or symmetrical can be obtained. Due to the isotropy or symmetry, with the star polymer according to the present invention it is advantageously possible to obtain materials, in particular polymer mixtures, having improved properties such as tensile strength, higher isotropy, and improved strength transverse to the direction of processing, compared to materials having more asymmetrical reinforcing agents such as glass fibers or montmorillonite.

In the context of the present invention, the term "arylene" refers in particular to a molecule part having an aromatic basic structure.

In particular, the arylene compound having two functional groups Y can be a phenylene compound having two functional groups Y. Here, the term "phenylene" can be understood in particular as referring to a molecule part having an aromatic carbon six-membered ring as a basic structure. Phenylene compounds can in some cases be more economical and easier to produce than other arylene compounds.

The functional groups X of the central compound may be the same as or different from one another.

Likewise, the functional groups Y of the arylene compound, in particular the phenylene compound, may be the same as or different from one another. Furthermore, the functional groups Y of the arylene compound, in particular the phenylene compound, can react with one another, forming covalent bonds. In this way, from two or more molecules of the arylene compound, arylene segments can be formed having two or more arylene repeat units.

In the context of the present invention, it is possible to use two or more different types of arylene compounds, in particular phenylene compounds, having two functional groups Y. In this way, arylene segments can be produced from two or more different types of substituted or unsubstituted arylene repeat units. Here, the types of arylene compounds, in particular phenylene compounds, may differ from one another in their substituents and/or in their basic structure. Examples of phenylene compound types having different substituents are benzoyl-para-phenylene compounds and 4'-phenoxybenzoyl-para-phenylene compounds. Examples of phenylene compound types having different basic structures are para-phenylene compounds, meta-phenylene compounds, and ortho-phenylene compounds.

In particular, the arylene compound having two functional groups Y can be a para-(functionalized)-phenylene compound having two functional groups Y. The resulting star polymers have the advantage that a parallel orientation of para-phenylene chains, as occur in linear para-phenylene polymers, can be reduced, which advantageously affects the reinforcement effect.

The central compound, the arylene compound, and the terminal group compound can in principle be both monomer and oligomer or polymer compounds. For example, the central compound, the arylene compound, and the terminal group compound can be oligomerized or polymerized in a preceding reaction.

The stoichiometric ratio of the compounds used is preferably selected such that arylene compound molecules can form chains with one another, each of which is terminated by a terminal group compound molecule, the number of chains corresponding to the number of functional groups of the central compound.

The stoichiometric ratio of terminal compound to arylene compound can be between 1:10 and 1:360, for example between 1:15 and 1:240, in particular between 1:30 and 1:120.

The central compound can be in particular a central compound having at least four, if warranted at least five, functional groups X. For example, the central compound can be a trifunctional central compound or a tetrafunctional central compound.

In a preferred specific embodiment, the central compound is selected from the group made up of 1,3,5-tris-(4-chlorobenzoylbenzene), 1,3,5-tris-(4-bromobenzoylbenzene), 1,3,5-tris-(4-iodobenzoylbenzene), tetrakis(4-chlorophenyl-methane), tetrakis-(4-bromophenylmethane) and tetrakis(4-iodo-phenylmethane).

In particular, the central compound can be tetrakis-(4-bromophenylmethane) (TBM):

or 1,3,5-tris-(4-chlorobenzoylbenzene) (TCBB):

Preferably, the functional groups, or the atoms of the central compound connected thereto, for example as in tetrakis-(4-bromophenylmethane) (TBM), do not lie exclusively in one plane. This can prevent the resulting star polymers from stacking, which can have a negative effect on the reinforcing effect.

In order to produce the star polymer according to the present invention, it is possible to use for example ≥90 to ≤99.5 mol % of arylene compound, ≥0.1 to ≤6 mol % of terminal group compound, and ≥0.05 to ≤5 mol % of trifunctional central compound, or ≥90 to ≤99.5 mol % of arylene compound, 0.1≥ to ≤7 mol % of terminal group compound, and ≥0.05 to ≤4 mol % of tetrafunctional central compound, the sums of the mole percents being 100 mol % in each case.

In a further preferred specific embodiment, the functional groups X of the central compound, the functional groups Y of the arylene compound, and the functional groups Z of the terminal group compound are selected from the group made up of fluorine, chlorine, bromine, and iodine, in particular chlorine and bromine. The conversion here can be metal-catalyzed, for example platinum-, palladium-, or nickel-catalyzed, in particular nickel-catalyzed. In particular, the conversion can take place in the presence of a platinum, palladium, or nickel catalyst, in particular a nickel catalyst. Here, central compounds, arylene compounds, and terminal group compounds are preferably used whose functional groups X, Y, or Z are bound to an aromatic system. Suitable catalysts and reaction conditions are described for example in U.S. Pat. No. 5,654,392, and in "Macromolecules," 1995, volume 28, page 3495.

The arylene compound or phenylene compound can for example include at least one substituent selected from the group made up of hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amines, alkylether, arylether, alkylsulfide, arylsulfide, alkylsulfone, arylsulfone, sulfonamide, thioether, halogens, in particular fluorine, chlorine, bromine, and iodine, halogen alkyl, in particular perfluoralkyl, for example trifluormethyl, halogen aryl, in particular perfluoraryl, for example pentafluorphenyl, carboxylic acids, carboxylic acid salts, sulfonic acids, sulfonic acid salts, and pyridyl, in particular benzoyl and phenoxybenzoyl. In particular, the substituents can include 1 to 30 carbon atoms. Preferably, the arylene compound or phenylene compound includes at least one substituent selected from the group made up of benzoyl and phenoxybenzoyl. Materials including such compounds advantageously have good resistance to media.

The arylene compound, or phenylene compounds, can in particular be selected from the group made up of para-functionalized benzoyl phenylenes, meta-functionalized benzoyl phenylenes, ortho-functionalized benzoyl phenylenes, para-functionalized 4'-phenoxybenzoyl phenylenes, meta-functionalized 4'-phenoxybenzoyl phenylenes, and ortho-functionalized 4'-phenoxybenzoyl phenylenes, in particular para-functionalized benzoyl phenylenes and para-functionalized 4'-phenoxybenzoyl phenylenes. Materials including such compounds advantageously have good resistance to media.

For example, the arylene compound can be a para-phenylene compound having the general formula (1):

or a meta-phenylene compound having the general formula (2):

or an ortho-phenylene compound having the general formula (3):

or can be a mixture of two or more of the above-named compounds, where $Y_1$, $Y_2$, $Y_3$, $Y_4$, $Y_5$, $Y_6$ stand, independently of one another, for a functional group Y, in particular one that can react with a functional group X of the central compound and/or the functional group Z of the terminal group compound and/or with a group Y of another arylene compound molecule, forming a covalent bond, and for example can be selected from the group made up of fluorine, chlorine, bromine, and iodine, in particular chlorine and bromine, and for example can be selected from the group made up of fluorine, chlorine, bromine, and iodine, in particular chlorine and bromine, and where $R_1$, $R_2$, $R_3$, $R_4$, $R_5$, $R_6$, $R_7$, $R_8$, $R_9$, $R_{10}$, $R_{11}$, $R_{12}$ stand, independently of one another, for hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, a cyclic amine, alkylether, arylether, alkylsulfide, arylsulfide, alkylsulfone, arylsulfone, sulfonamide, thioether, halogen, in particular fluorine, chlorine, bromine, and iodine, halogen alkyl, in particular perfluoralkyl, for example trifluormethyl, halogen aryl, in particular perfluoraryl, for example pentafluorphenyl, carboxylic acid, carboxylic acid salt, sulfonic acid, sulfonic acid salt, or pyridyl, in particular benzoyl and phenoxybenzoyl.

In a further preferred specific embodiment, the arylene compound is selected from the group made up of 2,5-dichlorobenzophenone, 2,5-dibromobenzophenone, 2,5-diiodobenzophenone, 2,5-dichloro-4'-phenoxybenzophenone, 2,5-dibromo-4'-phenoxy-benzophenone and 2,5-diiodo-4'-phenoxybenzophenone, in particular 2,5-dichlorobenzophenone. The terminal group compound can for example be a phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amine, alkylether, arylether, alkylsulfide, arylsulfide, alkylsulfone, arylsulfone, sulfonamide, thioether, halogen, in particular fluorine, chlorine, bromine, and iodine, halogen alkyl, in particular perfluoralkyl, for example trifluormethyl, halogenaryl, in particular perfluoraryl, for example pentafluorphenyl, carboxylic acid, carboxylic acid salt, sulfonic acid, sulfonic acid salt, and pyridylphenyl, biphenyl, naphthyl, phenanthryl, anthracenyl, benzoylphenyl, phenoxybenzoylphenyl, phenoxyphenyl, aryl, arylester, amide, arylamide, diarylamide, arylether, arylsulfide, arylsulfone or pyridyl compound, in particular a benzoylphenyl (benzophenone) or phenoxybenzoylphenyl compound, having a functional group Z. The terminal group compound can in particular be an aromatic terminal group compound. For example, the terminal group compound can be a benzophenone having a functional group Z, for example a benzophenone having a functional group Z at position 4. In particular, the terminal group compound can be a 4-halogen-benzophenone, in particular 4-chloro-benzophenone. 4-halogen-benzophenones advantageously have an electronic structure and reactivity similar to 2,5-halogen-benzophenones, for which reason the combination of this terminal group compound and arylene compound with one another is advantageous.

In a further preferred specific embodiment, the terminal group compound is selected from the group made up of 4-chlorobenzophenone, 4-bromobenzophenone, 4-iodobenzophenone, in particular 4-chlorobenzophenone.

A further subject matter of the present invention is a method for producing a star polymer, in which a central compound having at least three functional groups X, an arylene compound having two functional groups Y, and a terminal group compound having a functional group Z are converted, each of the functional groups X of the central compound reacting with a functional group Y of the arylene compound, forming a covalent bond, and the functional group Z of the terminal group compound reacting with a functional group Y of the arylene compound, forming a covalent bond, the terminal group compound being used in a stoichiometric quantity that corresponds essentially to the stoichiometric quantity of the functional groups X of the central compound.

Here, "essentially" means that deviations from a 1:1 ratio of less than 5%, for example less than 2%, are included.

As an arylene compound, for example a phenylene compound having two functional groups Y can be used. In particular, as an arylene compound a para-(functionalized)-phenylene compound having two functional groups Y can be used.

The functional groups X of the central compound can be the same as or different from one another. Likewise, the functional groups Y of the arylene compound, in particular phenylene compound, can be the same as or different from one another. In addition, the functional groups Y of the arylene compound, in particular phenylene compound, can react with one another, forming covalent bonds.

In the context of the present invention, it is possible to use two or more different types of arylene compounds, in particular phenylene compounds, having two functional groups Y.

The central compound, the arylene compound, and the terminal group compound can in principle be both monomer and also oligomer or polymer compounds. For example, the central compound, the arylene compound, and the terminal group compound can be oligomerized or polymerized in a preceding reaction.

The stoichiometric ratio of the compounds used is preferably selected such that arylene compound molecules can form chains with one another, each terminated by a terminal group compound molecule, the number of chains corresponding to the number of functional groups of the central compound.

The terminal group compound can be used, with regard to the arylene compound, in a stoichiometric ratio between 1:10 and 1:360, for example between 1:15 and 1:240, in particular between 1:30 and 1:120.

In the method, in particular it is also possible to use central compounds having at least four, if warranted at least five, functional groups. For example, a trifunctional central compound or a tetrafunctional central compound can be used.

In a preferred specific embodiment of the method according to the present invention, the central compound is selected from the group made up of 1,3,5-tris-(4-chlorobenzoylbenzene), 1,3,5-tris-(4-bromobenzoylbenzene), 1,3,5-tris-(4-iodobenzoylbenzene), tetrakis(4-chlorophenylmethane), tetrakis-(4-bromophenylmethane) and tetrakis(4-iodophenylmethane).

In particular, as the central compound tetrakis-(4-bromophenylmethane) (TBM):

or 1,3,5-tris-(4-chlorobenzoylbenzene) (TCBB):

can be used. Preferably, the functional groups, or the atoms of the central compound connected thereto, for example as in tetrakis-(4-bromophenylmethane) (TBM), do not lie exclusively in one plane.

In the method, it is possible to use for example ≥90 to ≤99.5 mol % of arylene compound, ≥0.1 to ≤6 mol % of terminal group compound, and ≥0.05 to ≤5 mol % of trifunctional central compound, or ≥90 to ≤99.5 mol % of arylene compound, 0.1≥ to ≤7 mol % of terminal group compound, and ≥0.05 to ≤4 mol % of tetrafunctional central compound, the sums of the mole percents being 100 mol % in each case.

In a further preferred specific embodiment of the method according to the present invention, the functional groups X of the central compound, the functional groups Y of the arylene compound, and the functional groups Z of the terminal group compound are selected from the group made up of fluorine, chlorine, bromine, and iodine, in particular chlorine and bromine. The conversion here can be metal-catalyzed, for example platinum-, palladium-, or nickel-catalyzed, in particular nickel-catalyzed. In particular, the conversion can take place in the presence of a platinum, palladium, or nickel catalyst, in particular a nickel catalyst. Here, central compounds, arylene compounds, and terminal group compounds are preferably used whose functional groups X, Y, or Z are bound to an aromatic system. Suitable catalysts and reaction conditions are described for example in U.S. Pat. No. 5,654, 392, and in "Macromolecules," 2005, volume 28, page 3495.

As an arylene compound or phenylene compound, for example an arylene compound or phenylene compound can be used that includes at least one substituent selected from the group made up of hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amines, alkylether, arylether, alkylsulfide, arylsulfide, alkylsulfone, arylsulfone, sulfonamide, thioether, halogens, in particular fluorine, chlorine, bromine, and iodine, halogen alkyl, in particular perfluoralkyl, for example trifluormethyl, halogen aryl, in particular perfluoraryl, for example pentafluorphenyl, carboxylic acids, carboxylic acid salts, sulfonic acids, sulfonic acid salts, and pyridyl, in particular benzoyl and phenoxybenzoyl. In particular, the substituents can include 1 to 30 carbon atoms. Preferably, an arylene compound or phenylene compound is used that includes at least one substituent selected from the group made up of benzoyl and phenoxybenzoyl.

The arylene compound, or phenylene compounds, can in particular be selected from the group made up of para-functionalized benzoyl phenylenes, meta-functionalized benzoyl phenylenes, ortho-functionalized benzoyl phenylenes, para-functionalized 4'-phenoxybenzoyl phenylenes, meta-functionalized 4'-phenoxybenzoyl phenylenes, and ortho-functionalized 4'-phenoxybenzoyl phenylenes, in particular para-functionalized benzoyl phenylenes and para-functionalized 4'-phenoxybenzoyl phenylenes.

For example, as an arylene compound a para-phenylene compound having the general formula (1):

or a meta-phenylene compound having the general formula (2):

or an ortho-phenylene compound having the general formula (3):

or a mixture of two or more of the above-named compounds can be used, where $Y_1$, $Y_2$, $Y_3$, $Y_4$, $Y_5$, $Y_6$ stand, independently of one another, for a functional group Y, in particular one that can react with a functional group X of the central compound and/or the functional group Z of the terminal group compound and/or with a group Y of another arylene compound molecule, forming a covalent bond, and for example can be selected from the group made up of fluorine, chlorine, bromine, and iodine, in particular chlorine and bromine,
and where $R_1$, $R_2$, $R_3$, $R_4$, $R_5$, $R_6$, $R_7$, $R_8$, $R_9$, $R_{10}$, $R_{11}$, $R_{12}$ stand, independently of one another, for hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, a cyclic amine, alkylether, arylether, alkylsulfide, arylsulfide, alkylsulfone, arylsulfone, sulfonamide, thioether, halogen, in particular fluorine, chlorine, bromine, and iodine, halogen alkyl, in particular perfluoralkyl, for example trifluormethyl, halogen aryl, in particular perfluoraryl, for example pentafluorphenyl, carboxylic acid, carboxylic acid salt, sulfonic acid, sulfonic acid salt, or pyridyl, in particular benzoyl and phenoxybenzoyl.

In a further preferred specific embodiment, the arylene compound is selected from the group made up of 2,5-dichlorobenzophenone, 2,5-dibromobenzophenone, 2,5-diiodobenzophenone, 2,5-dichloro-4'-phenoxybenzophenone, 2,5-dibromo-4'-phenoxy-benzophenone and 2,5-diiodo-4'-phenoxybenzophenone, in particular 2,5-dichlorobenzophenone. The terminal group compound can for example be a phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amine, alkylether, arylether, alkylsulfide, arylsulfide, alkylsulfone, arylsulfone, sulfonamide, thioether, halogen, in particular fluorine, chlorine, bromine, and iodine, halogen alkyl, in particular perfluoralkyl, for example trifluormethyl, halogenaryl, in particular perfluoraryl, for example pentafluorphenyl, carboxylic acid, carboxylic acid salt, sulfonic acid, sulfonic acid salt, and pyridylphenyl, biphenyl, naphthyl, phenanthryl, anthracenyl, benzoylphenyl, phenoxybenzoylphenyl, phenoxyphenyl, aryl, arylester, amide, arylamide, diarylamide, arylether, arylsulfide, arylsulfone or pyridyl compound, in particular a benzoylphenyl (benzophenone) or phenoxybenzoylphenyl compound, having a functional group Z. The terminal group compound can in particular be an aromatic terminal group compound. For example, the terminal group compound can be a benzophenone having a functional group Z, for example a benzophenone having a functional group Z at position 4. In particular, the terminal group compound can be a 4-halogen-benzophenone, in particular 4-chloro-benzophenone. 4-halogen-benzophenones advantageously have an electronic structure and reactivity similar to 2,5-halogen-benzophenones, for which reason the combination of this terminal group compound and arylene compound with one another is advantageous.

In a further preferred specific embodiment of the method according to the present invention, the terminal group compound is selected from the group made up of 4-chlorobenzophenone, 4-bromobenzophenone, 4-iodobenzophenone, in particular 4-chlorobenzophenone.

A further subject matter of the present invention is a star polymer having an at least three-bonded central unit and at least three chains connected to the central unit, the number of chains corresponding to the number of bonds of the central unit, each of the chains including a two-bonded arylene segment made up of at least one type of substituted or unsubstituted two-bonded arylene repeat unit and a one-bonded terminal group unit. Such star polymers can be part of a reaction product mixture from the method according to the present invention.

Due to its star-shaped structure, the star polymer according to the present invention can advantageously have a higher crystallinity than do asymmetrical polymers. Due to the arylene segments, the star polymer according to the present invention additionally has intrinsic rigidity. Therefore, the star polymer according to the present invention can advantageously be used as a "molecular reinforcing agent." Due to the isotropy or symmetry of the star polymer according to the present invention, materials can advantageously be obtained whose properties such as tensile strength have a higher isotropy than materials that include more asymmetrical reinforcing agents.

The "number of bonds" of a unit is to be understood in particular as the capacity of the unit to form covalent bonds to other units. Correspondingly, a one-bonded, two-bonded, or three-bonded unit (or segment) is to be understood as a unit (or segment) that can form one, two, or, respectively, three covalent bonds with one or more units (or segments).

Correspondingly, a two-bonded phenylene repeat unit can for example be a para-phenylene unit having the general formula (4):

a meta-phenylene unit having the general formula (5):

or an ortho-phenylene unit having the general formula (6):

where $Y_1$, $Y_2$, $Y_3$, $Y_4$, $Y_5$, $Y_6$ stand, independently of one another, for a functional group Y, in particular one that can react with a functional group X of the central compound and/or the functional group Z of the terminal group compound and/or with a group Y of another arylene compound molecule, forming a covalent bond, and for example can be selected from the group made up of fluorine, chlorine, bromine, and iodine, in particular chlorine and bromine, and where $R_1$, $R_2$, $R_3$, $R_4$, $R_5$, $R_6$, $R_7$, $R_8$, $R_9$, $R_{10}$, $R_{11}$, $R_{12}$ stand, independently of one another, for hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, a cyclic amine, alkylether, arylether, alkylsulfide, arylsulfide, alkylsulfone, arylsulfone, sulfonamide, thioether, halogen, in particular fluorine, chlorine, bromine, and iodine, halogen alkyl, in particular perfluoralkyl, for example trifluormethyl, halogen aryl, in particular perfluoraryl, for example pentafluorphenyl, carboxylic acid, carboxylic acid salt, sulfonic acid, sulfonic acid salt, or pyridyl, in particular benzoyl and phenoxybenzoyl.

In the context of the present invention, an "arylene segment" is understood in particular as an oligomer or polymer having the general formula (4):

where Ar is at least one type of substituted or unsubstituted two-bonded arylene repeat unit, and n is the average number of arylene repeat units. Correspondingly, a "phenylene segment" is understood in particular as an oligomer or polymer having the general formula (4), where Ar is at least one type of substituted or unsubstituted two-bonded phenylene repeat unit and n is the average number of arylene repeat units.

In particular, the number of terminal groups corresponds to the number of bonds of the central unit. Such star polymers can advantageously be easily produced by a terminal-group-controlled reaction process according to the present invention, in particular one in which the terminal groups and the number of bonds of the central unit are essentially in a 1:1 ratio.

The arylene segments can each have an average of at least two, for example at least 10, in particular at least 40, arylene repeat units. For example, the arylene segments can on average each have from $\geq 10$ to $\leq 240$, in particular $\geq 40$ to $\leq 120$, arylene repeat units. This has turned out to be advantageous for achieving a good to very good reinforcement effect.

The chains can in principle include, or be made up of, both identical and different, substituted or unsubstituted polyaryls or polyphenylenes, for example substituted or unsubstituted poly(para-phenylenes), in particular poly(benzoyl-para-phenylene) or poly(4'-phenoxybenzoyl-para-phenylene).

At least on average, the chains can however include the same arylene segments and terminal group units. In this way, it is advantageously possible to increase the symmetry of the star polymer and to simplify production. In particular, the star polymer can be a symmetrical star polymer. In this way, advantageously the isotropy of the properties of the star polymer according to the present invention can be optimized.

The two-bonded arylene segments can each be two-bonded phenylene segments made up of at least one type of substituted or unsubstituted two-bonded phenylene repeat unit. Phenylene segments can in some cases be more economical and easier to produce than other arylene segments. In particular, the two-bonded arylene segments can each be two-bonded para-phenylene segments made up of at least one type of substituted or unsubstituted two-bonded para-phenylene repeat unit (see general formula (1)). Such star polymers have the advantage that a parallel orientation of para-phenylene segments, as occurs in linear para-phenylene segments, can be reduced, which has an advantageous effect on the reinforcement.

In a further preferred specific embodiment, the arylene repeat units or phenylene repeat units include at least one substituent selected from the group made up of hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amines, alkylether, arylether, alkylsulfide, arylsulfide, alkylsulfone, arylsulfone, sulfonamide, thioether, halogens, in particular fluorine, chlorine, bromine, and iodine, halogen alkyl, in particular perfluoralkyl, for example trifluormethyl, halogen aryl, in particular perfluoraryl, for example pentafluorphenyl, carboxylic acids, carboxylic acid salts, sulfonic acids, sulfonic acid salts, and pyridyl. In particular, the substituents can include 1 to 30 carbon atoms. Preferably, the arylene repeat units or phenylene repeat units include substituents selected from the group made up of benzoyl and phenoxybenzoyl. Materials including such compounds advantageously have good resistance to media.

The arylene repeat units, or phenylene repeat units, can be selected from the group made up of benzoyl-para-phenylene, benzoyl-meta-phenylene, benzoyl-ortho-phenylene, 4'-phenoxybenzoyl-para-phenylene, 4'-phenoxybenzoyl-meta-phenylene, or 4'-phenoxybenzoyl-ortho-phenylene, in particular benzoyl-para-phenylene and 4'-phenoxybenzoyl-para-phenylene. Materials including such compounds advantageously have a particularly good resistance to media.

The central unit can be at least four-bonded, if warranted at least five-bonded. So that the number of chains according to the present invention corresponds to the number of bonds of the central unit, the star polymer has in particular at least four, if warranted at least five, chains connected to the central unit. Preferably, the bonding points of the central unit do not lie exclusively in one plane. This can prevent the resulting star polymers from stacking, which can have a negative effect on the reinforcement effect.

The terminal group units can for example be selected from the group made up of hydrogen, phenyl, biphenyl, naphthyl, phenanthryl, anthracenyl, benzyl, benzoyl, benzoylphenyl (benzophenone), phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amines, alkylether, arylether, alkylsulfide, arylsulfide, alkylsulfone, arylsulfone, sulfonamide, thioether, halogens, in particular fluorine, chlorine, bromine, and iodine, halogen alkyl, in particular perfluoralkyl, for example trifluormethyl, halogen aryl, in particular perfluoraryl, for example pentafluorphenyl, carboxylic acids, carboxylic acid salts, sulfonic acids, sulfonic acid salts, and pyridyl, in particular benzoyl and phenoxybenzoyl. Preferably, the terminal group units are aromatic terminal group units. In particular, the terminal group units can be 4-benzophenone units. 4-halogen-benzophenone units advantageously have an electronic structure and reactivity similar to 2,5-halogen-benzophenone units, for which reason the reaction of these units is favored.

In a further preferred specific embodiment, the star polymer corresponds to the general formula (I):

where

X is a multi-bonded central unit, in particular having number of bonds x,

Ar is at least one type of substituted or unsubstituted two-bonded arylene repeat unit, E is a one-bonded terminal group unit, n is the average number of arylene repeat units and is ≥2, and x is the number of chains connected to the central unit and is ≥3.

Multi-bonded central unit X can in particular be at least four-bonded, if warranted at least five-bonded.

Correspondingly, the number of chains connected to the central unit can be x≥4, if warranted ≥5.

For example, multi-bonded central unit X can be a three-bonded central unit (x=3), for example 1,3,5-tris-(4-benzoyl-benzene):

or a four-bonded central unit (x=4), for example tetrakis-(4-phenylmethane):

Correspondingly, the number of chains x connected to the central unit can be 3 or 4.

The arylene repeat unit Ar can include at least one substituent selected from the group made up of hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amines, alkylether, arylether, alkylsulfide, arylsulfide, alkylsulfone, arylsulfone, sulfonamide, thioether, halogens, in particular fluorine, chlorine, bromine, and iodine, halogen alkyl, in particular perfluoralkyl, for example trifluormethyl, halogen aryl, in particular perfluoraryl, for example pentafluorphenyl, carboxylic acids, carboxylic acid salts, sulfonic acids, sulfonic acid salts, and pyridyl, in particular benzoyl and phenoxybenzoyl. In particular, the arylene repeat unit Ar can be a phenylene repeat unit. This can be unsubstituted or can include at least one of the above-named substituents. For example, the arylene repeat unit Ar can be benzoyl-para-phenylene, benzoyl-meta-phenylene, benzoyl-ortho-phenylene, 4'-phenoxybenzoyl-para-phenylene, 4'-phenoxybenzoyl-meta-phenylene, or 4'-phenoxybenzoyl-ortho-phenylene, in particular benzoyl-para-phenylene or 4'-phenoxybenzoyl-para-phenylene.

The terminal group (E) can be for example hydrogen, phenyl, biphenyl, naphthyl, phenanthryl, anthracenyl, benzyl, benzoyl, benzoylphenyl (benzophenone), phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, cyclic amines, alkylether, arylether, alkylsulfide, arylsulfide, alkylsulfone, arylsulfone, sulfonamide, thioether, halogens, in particular fluorine, chlorine, bromine, and iodine, halogen alkyl, in particular perfluoralkyl, for example trifluormethyl, halogen aryl, in particular perfluoraryl, for example pentafluorphenyl, carboxylic acids, carboxylic acid salts, sulfonic acids, sulfonic acid salts, and pyridyl, in particular benzoyl and phenoxybenzoyl. Preferably, the terminal group unit is an aromatic terminal group unit. In particular, the terminal group units can be 4-benzophenone units.

The average number of arylene repeat units or phenylene repeat units n can be ≥2, in particular ≥10. For example, the average number of arylene repeat units or phenylene repeat units n can be from ≥2 to ≤360, for example from ≥10 to ≤240, in particular from ≥40 to ≤120.

For example, the star polymer can correspond to the general formula (I):

or to the general formula (II):

A further subject matter of the present invention is a polymer mixture (polymer blend) including at least one star polymer according to the present invention and at least one additional polymer. For example, the polymer mixture can include at least one star polymer according to the present invention and at least one thermoplastic polymer. In particular, the polymer mixture can include at least one star polymer according to the present invention and at least one polyamide, in particular a polyphthalamide. Due to the symmetry/isotropy of the star polymers according to the present invention, these polymer mixtures advantageously have no, or only a small, anisotropy of their physical properties. This has the advantage that the polymer mixtures—compared for example with polymer mixtures containing fibers whose fibers can orient themselves during processing under the influence of shearing, for example due to injection molding—can be processed significantly better, so that higher-quality products can be produced.

A further subject matter of the present invention relates to the use of a star polymer according to the present invention for reinforcing a polymer, in particular a thermoplastic polymer, for example a polyamide, in particular a polyphthalamide, and/or for increasing the elastic modulus of a polymer, in particular a thermoplastic polymer, for example a polyamide, in particular a polyphthalamide, and/or in a component, in particular for use in the automotive field. The star polymers according to the present invention can for example be used to increase the elastic modulus of a polymer, in particular a thermoplastic polymer, for example a polyamide, and/or in a component that comes into contact with a solvent (fuel, motor oil, brake fluid), in particular for the engine compartment and/or chassis area of motor vehicles.

DETAILED DESCRIPTION OF THE INVENTION

Examples 1.1 Production of a Star Polymer According to the Present Invention Having a Three-Bonded Central Unit (Star Polymer-3)

Into a 10 l reactor having a KPG stirrer, an internal thermometer and a reflux condenser, there was placed 7.5 l of anhydrous degassed N-methyl-2-pyrrolidinone (NMP), 15.55 g anhydrous $NiCl_2$ (0.12 mol), 71.9 g anhydrous NaI (0.48 mol), 393.0 g activated zinc (6.0 mol) and 378.0 g (1.44 mol) triphenylphosphine with an $N_2$ counterflow. The mixture was then agitated for approximately 4 h at an internal temperature of approximately 60° C. Subsequently, at this temperature there was added 1004.0 g (4.0 mol) 2,5-dichlorobenzophenone, 8.25 g (0.017 mol) 1,3,5-tris-(p-chlorobenzoyl)benzene, and 10.83 g (0.05 mol) 4-chlorobenzophenone with an $N_2$ counterflow. During the first 2 hours, the internal temperature was maintained by cooling the reactor such that the temperature did not exceed 80° C. Subsequently, agitation took place for 22 hours at an internal temperature of 70° C. After termination of the reaction, the cooled polymer mixture was precipitated in 42 l acetone. Solid zinc was then removed from the polymer in a mixture of 4.5 l ethanol and 1.2 l half-concentrated hydrochloric acid. Subsequently, the star polymer was cleaned by repeated washing processes with water (7×5 l) and acetone (5×5 l), and was dried at 80° C. in a vacuum until a constant weight was reached. Average number of poly(benzoyl-para-phenylene) repeat units: 80.

1.2 Production of a Star Polymer According to the Present Invention Having a Four-Bonded Central Unit (Star Polymer-4)

Into a 10 l reactor having a KPG stirrer, an internal thermometer and a reflux condenser, there was placed 7.5 l of anhydrous degassed N-methyl-2-pyrrolidinone (NMP), 15.55 g anhydrous $NiCl_2$ (0.12 mol), 71.9 g anhydrous NaI (0.48 mol), 393.0 g activated zinc (6.0 mol) and 378.0 g (1.44 mol) triphenylphosphine with an $N_2$ counterflow. The mixture was then agitated for approximately 3.5 h at an internal temperature of approximately 60° C. Subsequently, at this temperature there was added 1004.0 g (4.0 mol) 2,5-dichlorobenzophenone, 15.90 g (0.025 mol) tetrakis(4'-bromophenyl)methane and 21.67 g (0.1 mol) 4-chlorobenzophenone with an $N_2$ counterflow. During the first 2 hours, the internal temperature was maintained by cooling the reactor such that the temperature did not exceed 80° C. Subsequently, agitation took place for 22 hours at an internal temperature of 70° C. After termination of the reaction, the cooled polymer mixture was precipitated in 42 l acetone. Solid zinc was then removed from the polymer in a mixture of 4 l ethanol and 1.2 l half-concentrated hydrochloric acid. Subsequently, the star polymer was cleaned by repeated washing processes with water (6×5 l) and acetone (5×5 l), and was dried at 80° C. in a vacuum until a constant weight was reached. Average number of poly(benzoyl-para-phenylene) repeat units: 80.

2 Production of Polymer Mixtures

Polymer mixtures of a polyamide (PA) and glass fibers (GF), a star polymer (Star) according to the present invention, or linear poly(benzoyl-para-phenylene) (PBP linear) having a portion of intrinsically rigid chains comparable to the star polymer were produced in the melt in an extruder as shown in the following Table 1.

TABLE 1

| | PA (wt. %) | GF (wt. %) | PBP linear (wt. %) | Star (wt. %) | Elastic modulus 20° C. [GPa] | Elastic modulus 120° C. [GPa] |
|---|---|---|---|---|---|---|
| 0 | 100 | — | — | — | 2.8 | 2.3 |
| 1 | 85 | — | — | 15 | 3.2 | 2.6 |
| 2 | 70 | — | — | 30 | 3.9 | 3.2 |
| 3 | 50 | — | — | 50 | 4.8 | 3.9 |
| 4 | 30.5 | 30.5 | — | 39 | 13.9 | 12.3 |
| 5 | 70 | 30 | — | — | 10.1 | 8.9 |
| 6 | 35 | 30 | 35 | — | 9.4 | 8.4 |
| 7 | 70 | 30 | — | — | 8.6 | 7.6 |

In polymer mixtures 1 through 3, the above-described star polymer according to the present invention having a three-bonded central unit (star polymer-3) was used, and in polymer mixture 4 the above-described star polymer according to the present invention having a four-bonded central unit (star polymer-4) was used. As a polyamide, a polyphthalamide was used. In polymer mixtures 6 and 7, the glass fibers were added during the extrusion, while in polymer mixtures 4 and 5 commercially available polyphthalamide containing 50 wt.-% reinforcing glass fiber was used (Genestar G1500A, of the Kuraray company).

Figure 1:
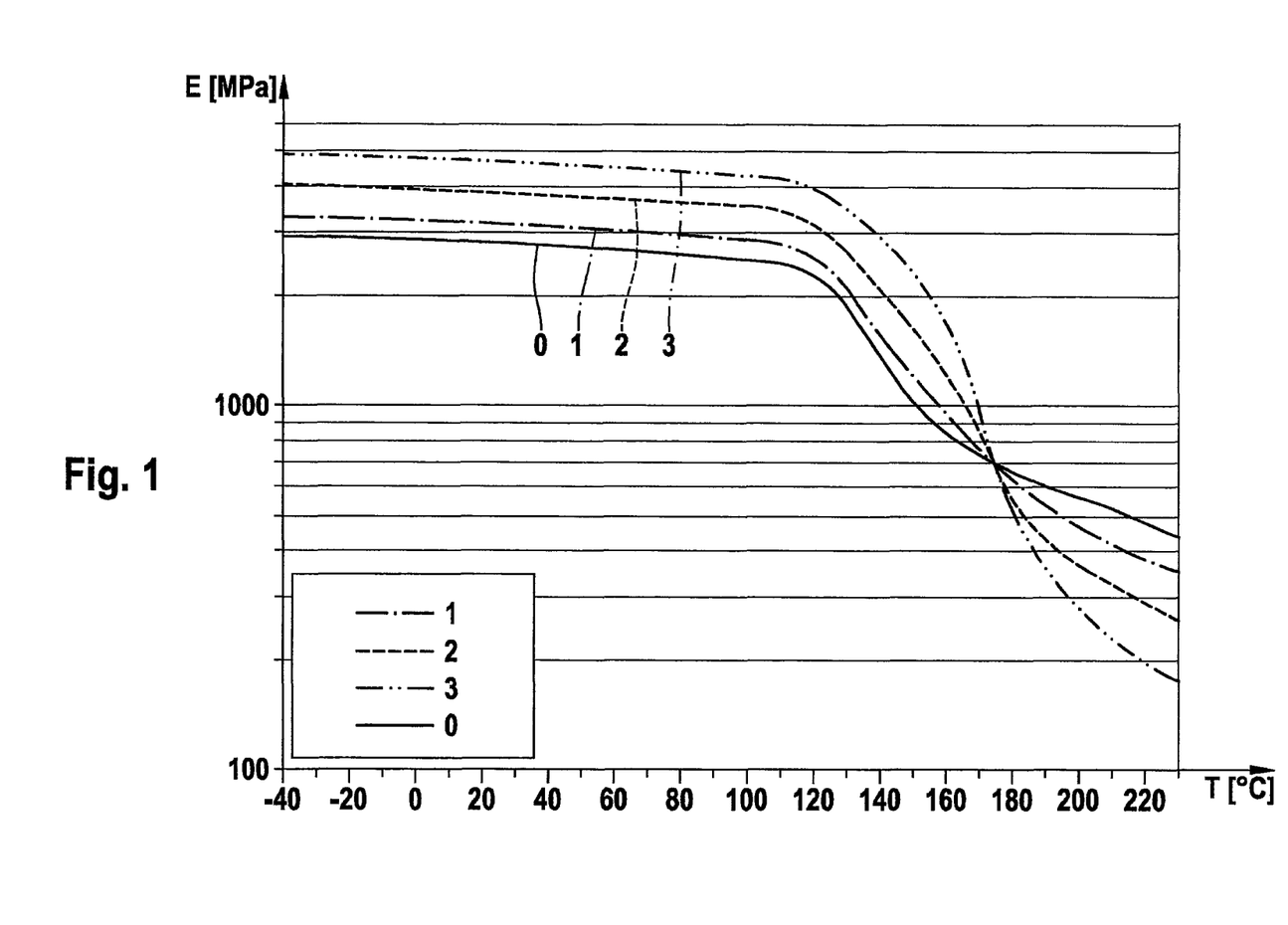
FIG. 1 shows a graph in which elastic moduli are plotted against temperature for some polymer mixtures.
Figure 2:
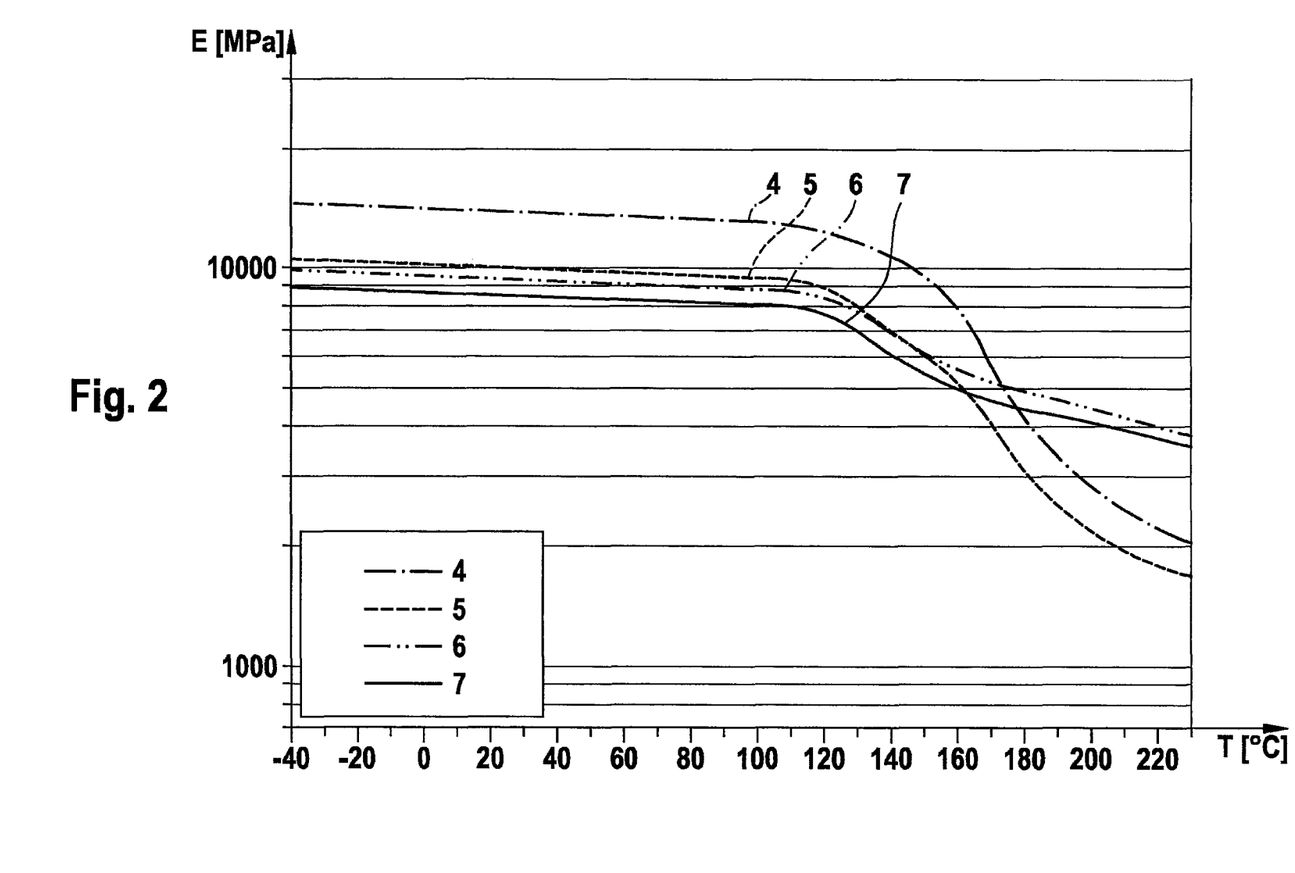
FIG. 2 shows a graph in which elastic moduli are plotted against temperature for some additional polymer mixtures.

The elastic moduli of the resulting polymer mixtures were determined by DMA measurements (see Table 1 and FIGS. 1 and 2).

Table 1 and FIG. 1 show that polymer mixtures 1, 2, and 3 according to the present invention have significantly higher rigidity or significantly higher elastic moduli than polyamide matrix material 0. Table 1 and FIG. 1 show in particular that addition of 50 wt.-% star polymer according to the present invention having a three-bonded central unit increases the elastic modulus of polyamide from 2.8 GPa to 4.8 GPa at 20° C., and from 2.3 GPa to 3.9 GPa at 120° C. This corresponds to an increase of the elastic modulus of approximately 70%.

Table 1 and FIG. 2 show that polymer mixture 4 according to the present invention, which includes the star polymer according to the present invention having a four-bonded central unit, has an increased elastic modulus compared to polymer mixtures 5, 6, and 7. In polymer mixture 6, which includes linear poly(benzoyl-para-phenylene), the elastic modulus increases by approximately 11% compared to reference material 7. In polymer mixture 4 according to the present invention, the elastic modulus increases by approximately 38% compared to reference material 5. Comparison of polymer mixtures 4 and 6 thus shows that the use of star polymers according to the present invention achieved a significantly greater reinforcing effect, and that star polymers according to the present invention act as "molecular reinforcing agents."

What is claimed is:
1. A star polymer produced by a process comprising:
   converting (i) a central compound having at least three functional groups X, (ii) an arylene compound having two functional groups Y, and (iii) a terminal group compound having a functional group Z,
   wherein the functional groups X of the central compound each react with a functional group Y of the arylene compound and form a covalent bond, wherein the functional group Z of the terminal group compound reacts with a functional group Y of the arylene compound and forms a covalent bond, and wherein the terminal group compound is used in a stoichiometric quantity which corresponds essentially to the stoichiometric quantity of the functional groups X of the central compound;

wherein the conversion is catalyzed by one of platinum, palladium, or nickel, and wherein the stoichiometric ratio of the terminal group compound to the arylene compound is between 1:10 and 1:360.

2. The star polymer as recited in claim 1, wherein each of the functional groups X of the central compound, the functional groups Y of the arylene compound, and the functional group Z of the terminal group compound are selected from the group consisting of fluorine, chlorine, bromine, and iodine.

3. The star polymer as recited in claim 1, wherein the arylene compound is selected from the group consisting of para-functionalized benzoyl phenylenes, meta-functionalized benzoyl phenylenes, ortho-functionalized benzoyl phenylenes, para-functionalized 4'-phenoxybenzoyl phenylenes, meta-functionalized 4'-phenoxybenzoyl phenylenes, and ortho-functionalized 4'-phenoxybenzoyl phenylenes.

4. The star polymer as recited in claim 3, wherein the arylene compound is one of:

a para-phenylene compound having the general formula a meta-phenylene compound having the general formula an ortho-phenylene compound having the general formula or a mixture of at least two of the above-named compounds, wherein $Y_1, Y_2, Y_3, Y_4, Y_5$ and $Y_6$ each represent, independently of one another, a functional group Y selected from the group consisting of fluorine, chlorine, bromine, and iodine, and wherein $R_1, R_2, R_3, R_4, R_5, R_6, R_7, R_8, R_9, R_{10}, R_{11}$ and $R_{12}$ each represent, independently of one another, one of hydrogen, phenyl, biphenyl, naphthyl, phenanthryl, anthracenyl, benzyl, benzoyl, benzoylphenyl, phenoxybenzoylphenyl, naphthoyl, phenoxy, phenoxyphenyl, phenoxybenzoyl, alkyl, alkoxy, acyl, aryl, heteroaryl, alkylketone, arylketone, alkaryl, aryloxy, alkylester, arylester, amide, alkylamide, dialkylamide, arylamide, diarylamide, alkylarylamide, a cyclic amine, alkylether, arylether, alkylsulfide, arylsulfide, alkylsulfone, arylsulfone, sulfonamide, thioether, halogen, halogen alkyl, halogen aryl, carboxylic acid, carboxylic acid salt, sulfonic acid, sulfonic acid salt, or pyridyl.

5. A star polymer produced by a process comprising:

converting (i) a central compound having at least three functional groups X, (ii) an arylene compound having two functional groups Y, and (iii) a terminal group compound having a functional group Z, wherein the functional groups X of the central compound each react with a functional group Y of the arylene compound and form a covalent bond, wherein the functional group Z of the terminal group compound reacts with a functional group Y of the arylene compound and forms a covalent bond, and wherein the terminal group compound is used in a stoichiometric quantity which corresponds essentially to the stoichiometric quantity of the functional groups X of the central compound;

wherein the conversion is catalyzed by one of platinum, palladium, or nickel wherein one of the following mixtures are used: (i) ≥90 to ≤99.5 mol % of the arylene compound, ≥0.1 to ≤6 mol % of the terminal group compound, and ≥0.05 to ≤5 mol % of the central compound, or (ii) ≥90 to ≤99.5 mol % of the arylene compound, ≥0.1 to ≤7 mol % of the terminal group compound, and ≥0.05 to ≤4 mol % of the central compound, and wherein the sum of the mole percents is 100 mol % in each case.

6. A star polymer produced by a process comprising:

converting (i) a central compound having at least three functional groups X, (ii) an arylene compound having two functional groups Y, and (iii) a terminal group compound having a functional group Z, wherein the functional groups X of the central compound each react with a functional group Y of the arylene compound and form a covalent bond, wherein the functional group Z of the terminal group compound reacts with a functional group Y of the arylene compound and forms a covalent bond, and wherein the terminal group compound is used in a stoichiometric quantity which corresponds essentially to the stoichiometric quantity of the functional groups X of the central compound;

wherein the conversion is catalyzed by one of platinum, palladium, or nickel, wherein at least one of:

(i) the central compound is selected from the group consisting of 1,3,5-tris-(4-chlorobenzoylbenzene), 1,3,5-tris-(4-bromobenzoylbenzene), 1,3,5-tris-(4-iodobenzoylbenzene), tetrakis(4-chlorophenylmethane), tetrakis-(4-bromophenylmethane) and tetrakis(4-iodo phenylmethane);

(ii) the arylene compound is selected from the group consisting of 2,5-dichlorobenzophenone, 2,5-dibromobenzophenone, 2,5-diiodobenzophenone, 2,5-dichloro-4'-phenoxybenzophenone, 2,5-dibromo-4'-phenoxybenzophenone, and 2,5-diiodo-4'-phenoxybenzophenone; and (iii) the terminal group compound is selected from the group consisting of 4-chlorobenzophenone, 4-bromobenzophenone, and 4-iodobenzophenone.

7. A method for producing a star polymer, comprising:
converting (i) a central compound having at least three functional groups X, (ii) an arylene compound having two functional groups Y, and (iii) a terminal group compound having a functional group Z,
wherein the functional groups X of the central compound each react with a functional group Y of the arylene compound and form a covalent bond,
wherein the functional group Z of the terminal group compound reacts with a functional group Y of the arylene compound and forms a covalent bond, and
wherein the terminal group compound is used in a stoichiometric quantity which corresponds essentially to the stoichiometric quantity of the functional groups X of the central compound; and
wherein the conversion is catalyzed by one of platinum, palladium, or nickel.

8. A polymer mixture, comprising:
at least one star polymer produced by a process comprising:
converting (i) a central compound having at least three functional groups X, (ii) an arylene compound having two functional groups Y, and (iii) a terminal group compound having a functional group Z,
wherein the functional groups X of the central compound each react with a functional group Y of the arylene compound and form a covalent bond,
wherein the functional group Z of the terminal group compound reacts with a functional group Y of the arylene compound and forms a covalent bond, and
wherein the terminal group compound is used in a stoichiometric quantity which corresponds essentially to the stoichiometric quantity of the functional groups X of the central compound; wherein the conversion is catalyzed by one of platinum, palladium or nickel; and
at least one additional polymer.

* * * * *